(12) United States Patent
McLean

(10) Patent No.: US 10,833,520 B2
(45) Date of Patent: Nov. 10, 2020

(54) WIRELESS COMMUNICATIONS UNIT

(71) Applicant: Mine Site Technologies Pty Ltd, New South Wales (AU)

(72) Inventor: Stuart McLean, New South Wales (AU)

(73) Assignee: Mine Site Technologies Pty Ltd, New South Wales (AU)

( * ) Notice: Subject to any disclaimer, the term of this patent is extended or adjusted under 35 U.S.C. 154(b) by 143 days.

(21) Appl. No.: 16/319,582

(22) PCT Filed: Jul. 21, 2017

(86) PCT No.: PCT/AU2017/050754
§ 371 (c)(1),
(2) Date: Jan. 22, 2019

(87) PCT Pub. No.: WO2018/014087
PCT Pub. Date: Jan. 25, 2018

(65) Prior Publication Data
US 2020/0112189 A1      Apr. 9, 2020

(30) Foreign Application Priority Data

Jul. 22, 2016    (AU) ................................ 2016902896

(51) Int. Cl.
*H02J 7/00*      (2006.01)
*H01M 10/42*    (2006.01)
(Continued)

(52) U.S. Cl.
CPC ......... *H02J 7/0047* (2013.01); *H01M 10/425* (2013.01); *H01M 10/441* (2013.01);
(Continued)

(58) Field of Classification Search
CPC ...................................................... H02J 7/0047
(Continued)

(56) References Cited

U.S. PATENT DOCUMENTS 6,043,626 A * 3/2000 Snyder ................... H02J 7/342
                                                                320/113
6,081,096 A * 6/2000 Barkat ...................... G06F 1/26
                                                                320/124
(Continued)

OTHER PUBLICATIONS

International Preliminary Report on Patentability; dated Nov. 2, 2018 for PCT Application No. PCT/AU2017/050754.

*Primary Examiner* — Jerry D Robbins
(74) *Attorney, Agent, or Firm* — Mendelsohn Dunleavy, P.C.; Steve Mendelsohn

(57) ABSTRACT

A wireless communications unit is provided, such as a portable unit to serve as an access point and/or a repeater node in a wireless meshing network, including at least two removable power source modules engageable with and electrically connectable to the unit to provide electrical power thereto, and a mechanism to allow selective disconnection and removal of one power source module from the unit while maintaining connection and retention to the unit of another power source module. The mechanism comprises a rotatable wheel having a radially projecting portion (such as a cam lobe). When the wheel is rotated the projecting portion bears against a part of the first power source module to push it into an ejected position while electrically disconnecting it from the unit, to allow removal and recharge/replacement.

23 Claims, 4 Drawing Sheets

(51) Int. Cl.
*H01M 10/44* (2006.01)
*H01M 10/48* (2006.01)

(52) U.S. Cl.
CPC ......... *H01M 10/482* (2013.01); *H02J 7/0045* (2013.01); *H01M 2010/4271* (2013.01)

(58) Field of Classification Search
USPC ........................................................ 320/107
See application file for complete search history.

(56) References Cited

U.S. PATENT DOCUMENTS

| | | | |
|---|---|---|---|
| 2008/0137589 A1* | 6/2008 | Barrett | H04W 4/18 370/327 |
| 2010/0304200 A1* | 12/2010 | Lai | H01M 2/1066 429/99 |
| 2013/0157713 A1* | 6/2013 | Stolarczyk | H01Q 1/2208 455/550.1 |
| 2014/0111961 A1* | 4/2014 | Liu | H04M 1/0262 361/814 |
| 2014/0165379 A1 | 6/2014 | Diebel et al. | |

\* cited by examiner

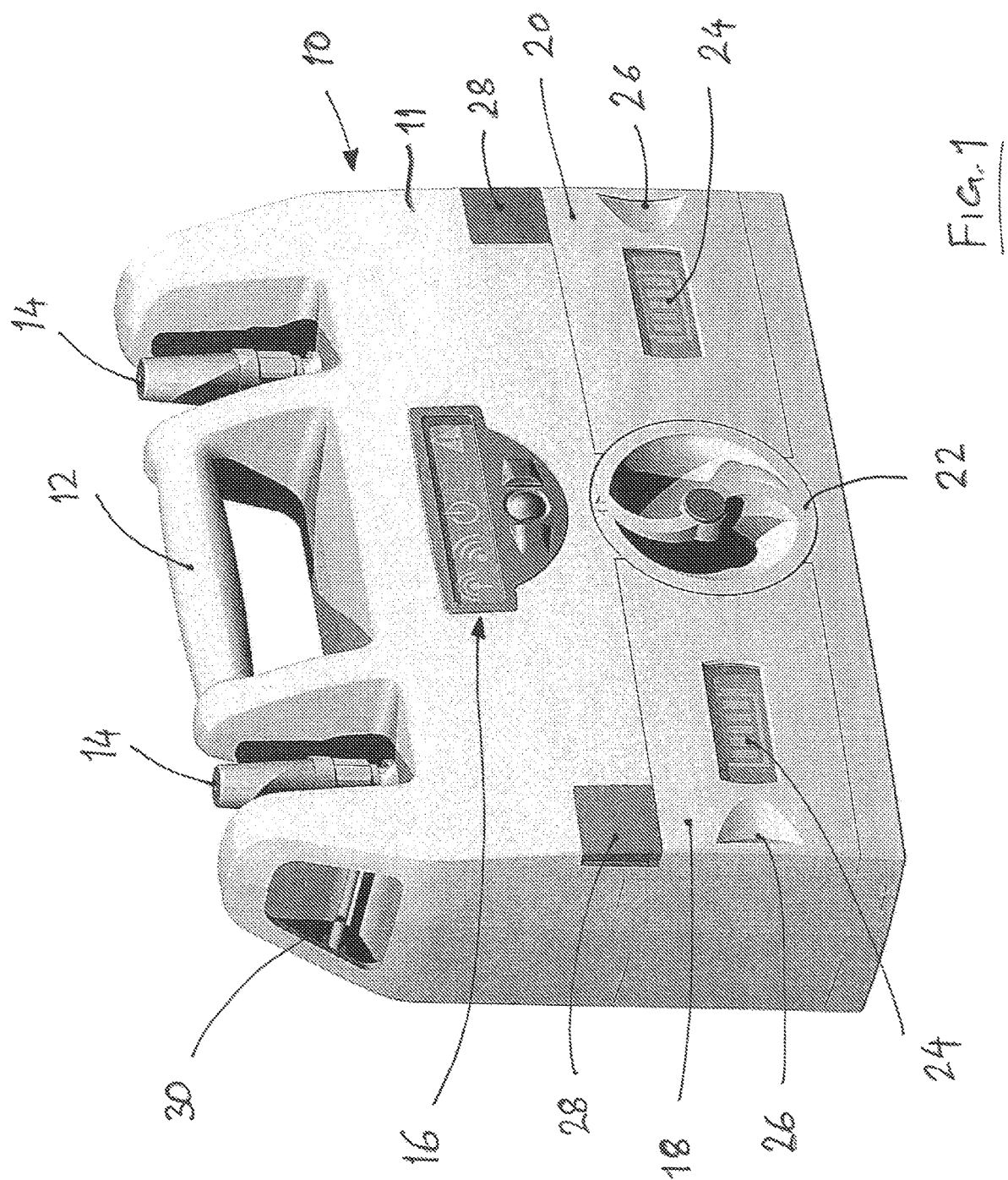

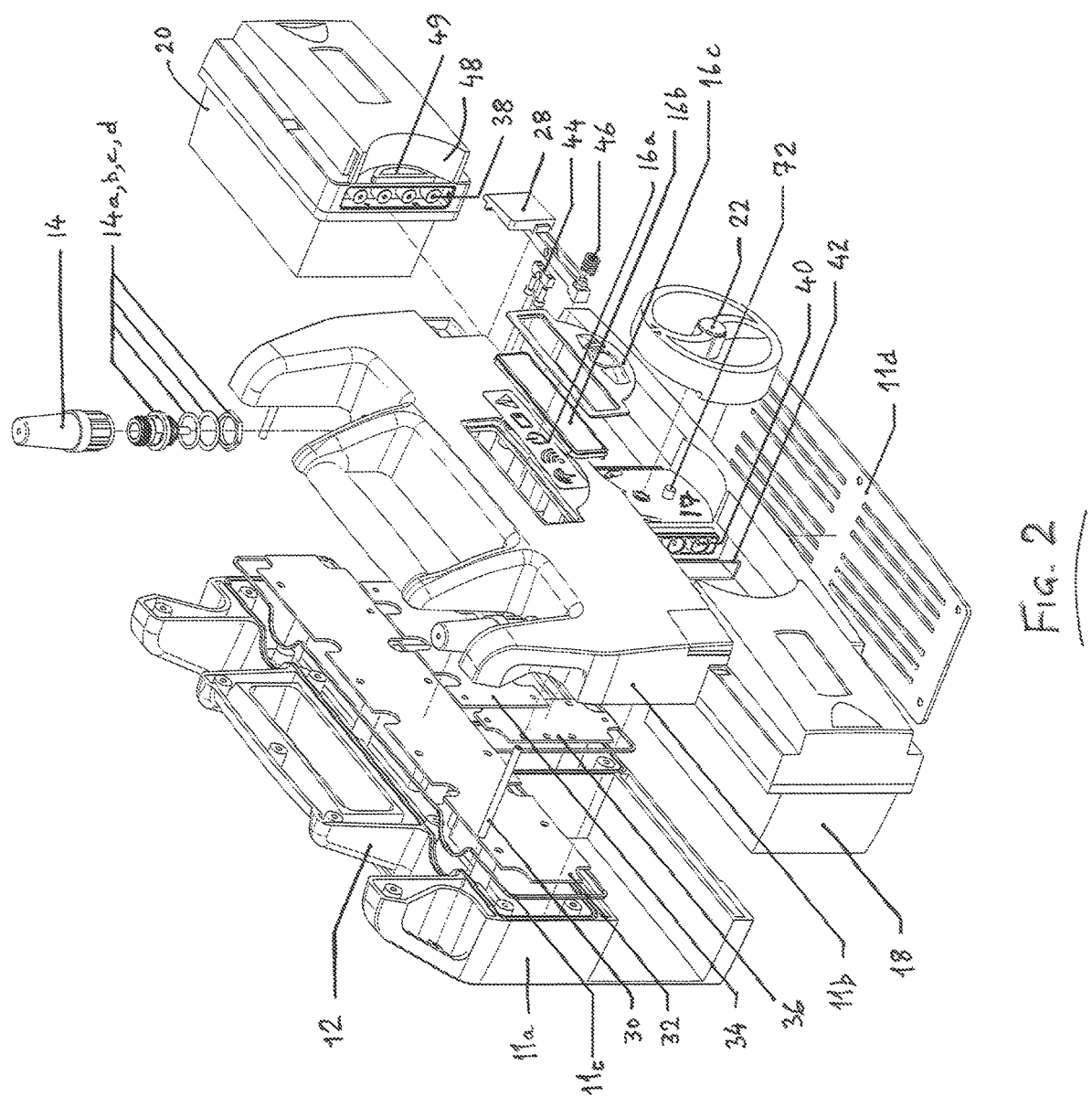

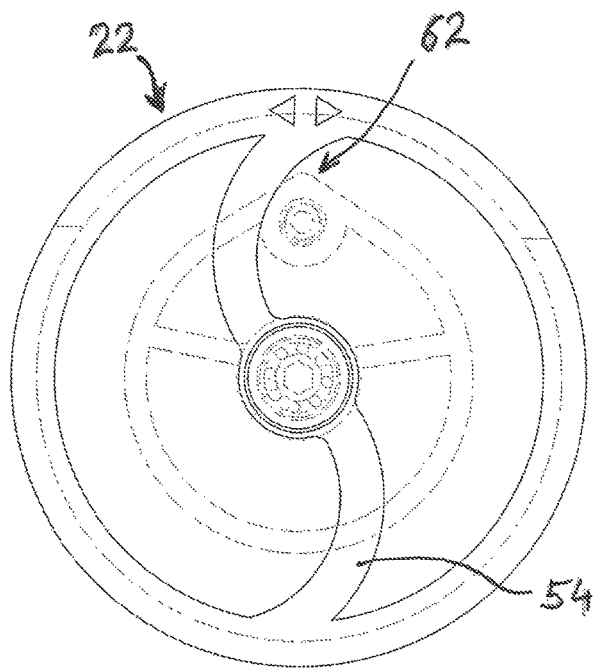
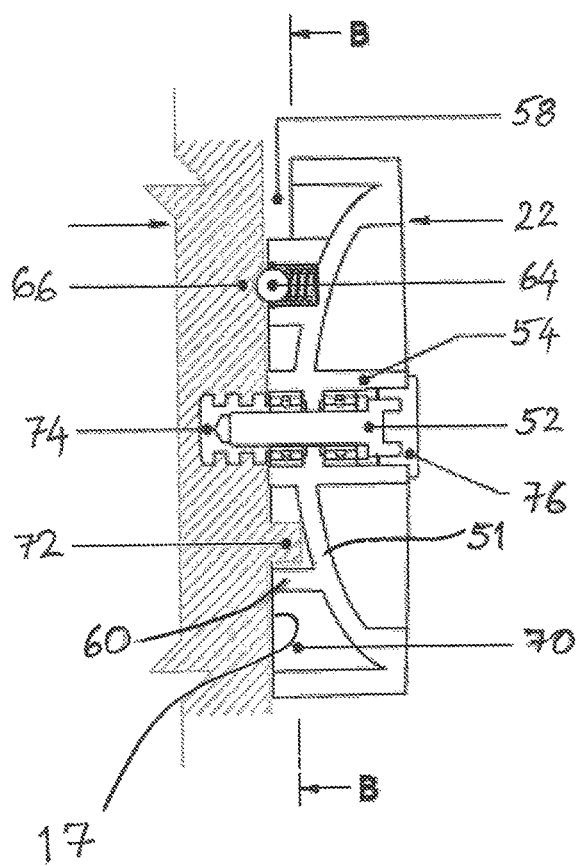
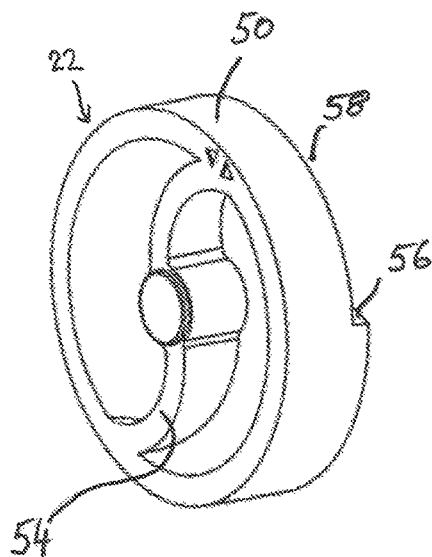
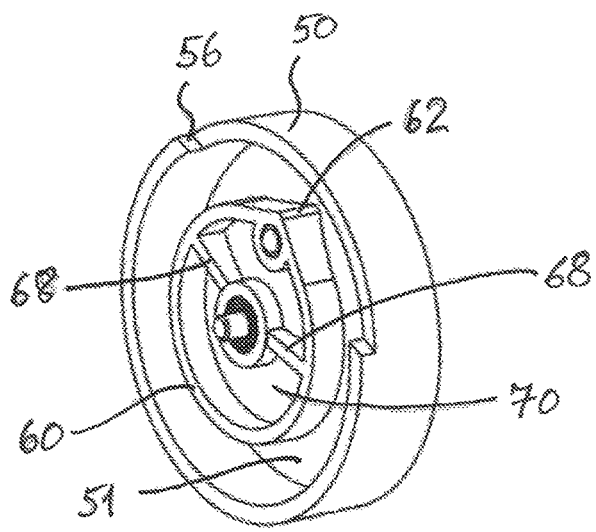
Fig. 3c
Fig. 3D
Fig. 3A
Fig. 3B
Fig. 3

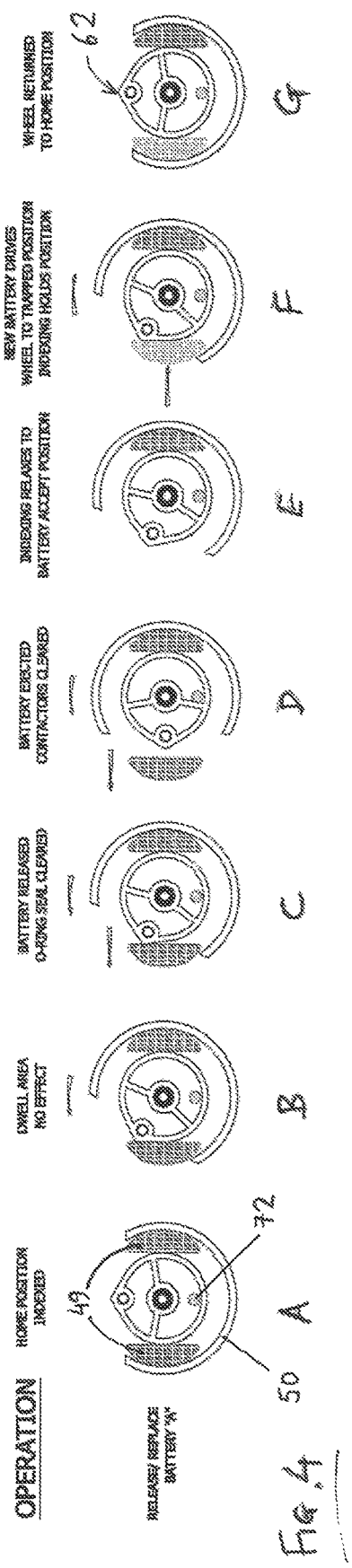
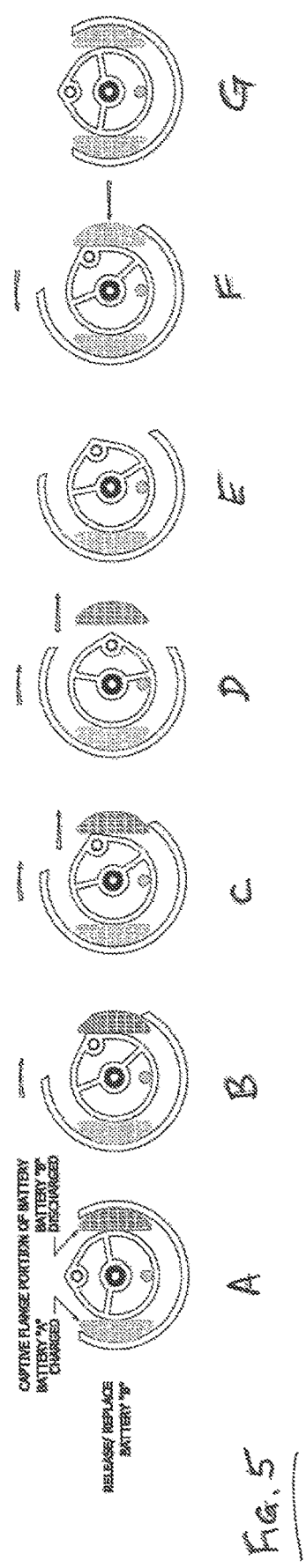

WIRELESS COMMUNICATIONS UNIT

RELATED APPLICATION

This application claims the benefit of Australian Provisional Patent Application No 2016902896, filed on 22 Jul. 2016, the disclosures of all of which are hereby expressly incorporated by reference in their entirety.

FIELD OF THE INVENTION

The invention concerns a wireless communications unit. In particular, the invention relates to a portable self-meshing access point and repeater node, for use in communications infrastructure deployed in an underground mine or similar environment.

BACKGROUND OF THE INVENTION

Until relatively recently the most effective underground communications was by way of a wire line telephone, as conventional UHF and VHF radios are limited to line of sight and subject to severe distance attenuation due to wave guide and skin effects on electromagnetic waves underground. As will be further understood, extremely high powers are required to provide any acceptable degree of ground penetration by electromagnetic waves.

Further, underground communications solutions have been built around HF leaky feeder systems and, more recently, around underground mesh networked systems.

A wireless mesh network (WMN) is a communications network made up of radio nodes organized in a mesh topology, ie. a topology in which each node is configured to relay data for the network. A WMN generally consists of mesh clients (eg. laptops, mobile phones and other wireless devices), mesh routers or nodes (which forward traffic to and from the gateways) and gateways (which may be connected to the Internet). The nodes networked in a mesh hence act as transit hops to carry each other's traffic towards the best suited gateway.

Access to the mesh is thus dependent on the radio nodes working in harmony with each other to create the overall radio network. Often, a WMN is an ad hoc network, and provides an appropriate level of redundancy. When one node can no longer operate, the rest of the nodes can still communicate with each other, directly or through one or more intermediate nodes. WMNs can therefore self form and self heal.

WMNs can be implemented with various wireless technologies, including 802.11, 802.15, 802.16 and cellular technologies. Of course, a WMN need not be restricted to a single technology or protocol.

One application of WMNs is in mine communication systems, and the present invention has been devised particularly, though not solely, for communications in underground mines.

SUMMARY OF THE INVENTION

In a first aspect the invention provides a wireless communications unit, including:
at least two removable power source modules engageable with and electrically connectable to the unit to provide electrical power thereto;
a mechanism to allow selective disconnection and removal of a first power source module from the unit while maintaining connection and retention of a second power source module to the unit.

The wireless communications unit may be a portable unit to serve as an access point and/or a repeater node in a wireless meshing network.

The wireless communications unit may include recess ports sized and shaped to receive the removable power source modules, the power source modules being of a common form, such that a module can received by different recess ports.

In a form, the mechanism includes a retention element which physically engages with a part of the first power source module.

The mechanism may be configured to operate to physically eject and disconnect the first power source module (selectively, and selected one of the modules). The operation may simultaneously act on the retention element to realise or maintain its engagement with the second power source module.

In a form, the mechanism comprises a rotatable wheel having a radially projecting portion, such that when the wheel is rotated the projecting portion bears against a part of the first power source module to urge it into an ejected position and electrically disconnect it from the unit. The wheel may comprise the retention element, and rotation of the wheel brings the retention element into engagement with a complementary shaped retention portion of the second power source module.

The radially projecting portion may be a cam lobe on the wheel.

The mechanism thus provides a unitary mechanism able to serve the purpose both of retaining multiple battery modules and selectively disconnecting and ejecting single battery modules.

In a form, the power source modules are removed in a direction substantially perpendicular to the axis of rotation of the rotatable wheel.

When used with dual battery modules, the mechanism may be configured such that rotating the rotatable wheel clockwise provides disconnection and ejection of one battery module, and rotating the rotatable wheel anticlockwise provides disconnection and ejection of the other battery module.

In an embodiment, the mechanism includes indexed means to hold or bias it in at least one position. This may include a normal position, at which the unit is engaged with and in electrical connection to the at least two removable power source modules. In addition, the indexing may include a second position, at which the first power source is disconnected.

Further, the mechanism may include a stop means, limiting the rotation of the wheel.

In a form, the unit includes a latching element for at least one of the removable power source modules, whose actuation is required in addition to operation of the mechanism, in order to remove a power source module.

In this way, in order to remove a battery module, an operator is required to carry out a deliberate and determined action (namely, operation of both the mechanism and the latching element, a two handed operation).

The unit may be configured to comply with fire and explosion protection measures suitable for the intended application, such as meeting intrinsic safety (IS) standards.

The unit may include dedicated power circuitry to selectively route power from each power source module in accordance with a protocol, whereby when a first power source module is depleted to a prescribed threshold, power is routed from a second power source module.

Further, the protocol may provide that when all power source modules to a unit are depleted to the prescribed threshold, power is routed from all power source modules.

The protocol may provide that when power is routed from one power source module and that power source is disconnected, power is automatically re-routed from another power source module.

In a form, the power source modules are rechargeable battery modules, and the unit includes a battery status and/or charge level indicator for each power source module. The unit may, for example, use dual lithium ion battery modules.

The unit is configured to work with a suitable wireless communications standard, such as the 802.11 wireless protocol.

The unit may be further configured to act as a tag reader to provide presence, location or proximity determination of tags carried by personnel or provided on equipment or vehicles. This may, for example, be as part of a WiFi or ZigBee radio system.

The unit may include one or more a suspension means to assist in mounting or carrying.

In a second aspect the present invention further provides a communications system including a plurality of the above-defined wireless communications units.

The features described with respect to any aspect of the invention can equally be applied, where suitable, to any other aspect of the invention.

Reference in this specification to 'one embodiment' or 'an embodiment' means that a particular feature, structure, or characteristic described in connection with the embodiment is included in at least one embodiment of the present invention. Thus, where phrases such as 'in one embodiment' or 'in an embodiment' appear, they do not necessarily refer to the same embodiment. Furthermore, the particular features, structures, or characteristics described herein may be combined in any suitable manner in one or more combinations.

In order that the present invention may be more clearly understood, preferred embodiments will be described with reference to the following drawings and description.

BRIEF DESCRIPTION OF THE DRAWINGS

To enable a clearer understanding, the invention will now be further explained and illustrated with regard to an exemplary non-limiting embodiment, with reference to the accompanying drawings, in which:

FIG. 1 illustrates an embodiment of the wireless communication unit of the invention;

FIG. 2 shows an exploded view of the unit of FIG. 1;

FIGS. 3A to 3D show the details of the battery hot swapping mechanism of the unit of FIG. 1;

FIGS. 4A-G illustrate diagrammatically the operation of release of a first battery while maintaining engagement of a second battery; and FIGS. 5A-G illustrate diagrammatically the operation of release of a second battery while maintaining engagement of a first battery.

DETAILED DESCRIPTION OF THE EMBODIMENTS

The device of the present invention was developed as an ad-hoc extension to a communications network, with particular application to VOIP, tracking and data transport. It was designed for short to medium term deployment in mine sites and other situations which may involve hazardous or otherwise difficult conditions.

The embodiment of FIG. 1 is also shown in exploded form in FIG. 2. A fuller understanding will be gained from a review of the parts list below, which sets out the various components of the unit, and provides further detail regarding the function, technical specification and/or material of the primary components.

As an important feature for employment in potentially hazardous environments, the unit is designed to meet fire and explosion protection measures appropriate for the particular environment of use. In underground mines, for example, it may be designed to be 'Intrinsically safe'. Intrinsic safety (IS) refers to a protection technique for safe operation of electrical equipment in hazardous areas by limiting the energy (both electrical and thermal) available for ignition. IS technology is thus generally applicable in areas subject to high concentrations of flammable gases or dust, such as petrochemical refineries and mines. Importantly, the IS approach provides a solution applicable across the range of known risks implicit in hazardous areas, and is recognised throughout the world.

In particular, the unit developed by the applicant was designed to meet IEC and MSHA requirements.

In addition to the electrical components used in the unit, the design is water resistant, featuring a gasket seal 11c between the rear and front housing parts 11a and 11b, as well as battery engagement gaskets 42 to protect the electrical connections with the battery modules 18, 20.

With regard to main PCA 32, a unit developed by the applicant utilises the Atheros AR9331 (Hornet) Wi-Fi System-On-Chip (WiSOC) device for 802.11b/g/n MESH/WLAN and AP (Wi-Fi) functions.

The unit illustrated is provided with short range antennae 14, which are removable and interchangeable with other types of antenna, and connectable to external antenna equipment if required, by way of connections 14a.

The unit is designed to be portable, so that it can readily be moved by way of handle 12 and installed in different locations for short to medium periods. It can be used carried or free standing, or can be mounted by suspending by way of its carry strap anchor bar 30 using carabiners, webbing straps, cable hooks, etc, or mounted via a secondary shock mounted roof/rock bolt and keyhole mounting plate.

The unit is powered by dual Lithium Ion 100 WHr self-contained battery modules 18 and 20. As an example, the modules may comprise Sanyo UR18650F 2300 mAH cells in a 2S6P configuration. Other suitable modules include Sanyo UR1860FM 2600 mAH cells in a 2S5P configuration, combining to provide 96 WHr capacity per pack/battery.

Each battery module 18, 20 is provided at its distal end with power output electrical contacts 38 as shown (FIG. 2), and is received by sliding engagement in a complementary receiving recess port in the body of the unit. As shown, the front part of the distal end of each battery module features an arcuate concave face 48 and a segment-shaped portion projecting in the forward direction (ie. in the direction outward from the front face of the unit) to provide an engagement projection 49, which features a planar distal face on one side and an arcuate convex face on the other, parallel to the curvature of arcuate concave face 48.

Battery modules 18 and 20 are identical, such that the same module can be introduced into one or other of the receiving ports, and it is therefore not necessary to provide right- and left-handed stock.

On opposed sides of the front face of unit 10 are provided respective battery module latches 28 to secure each battery module 18, 20. As FIG. 2 shows, each latch has a finger engagement tab connecting to an arm that pivots about a pivot point 44 against a small compression spring 46. A detent on latch 28 interacts with a receiving notch on the battery module, so manual depression of the finger engagement tab of the latch is required before a battery module can be removed.

By way of example, the battery modules tested were rated to provide up to around 100 hours of operation (taking into account the 24 hour reserve required for emergency communications). Battery charge gauging is used to indicate battery charge levels, displayed on the front of each battery module (25%, 50%, 75% & 100% capacity+reserve) by way of indicators 24, and communicated through the system with alarms activating when each battery module is at a prescribed depletion level, indicating it should be swapped out. The batteries can be fully recharged in under 8 hours. Indicators 24 provide both status (ie. if the battery is 'on load' or not) and current charge level. It should be noted that unit is configured to continuously communicate the battery status to the network, so that the status of each battery at each node can be constantly monitored by control room operators, and alerts can likewise be provided to central control, as well as on the unit itself.

The dual battery system allows for 'hot swapping', so as to maintain any active links and maintain the live mesh while charged battery modules are swapped with depleted modules. The unit utilises a unique mechanism featuring hot swapping wheel 22, to provide for removal and replacement of only one battery at a time. The mechanism ensures batteries can only be disengaged and removed by a deliberate action, and when a battery has been disengaged the other battery is retained in place to prevent disengagement.

FIG. 3 shows the details of the hot swapping wheel 22. Wheel 22 is defined by an outer circumferential wall 50 integrated with a dished base 51, and is arranged to rotate about an axis provided by a ball race axle 52 which connects with and is held in a hub receiver 74 on a planar mounting face 17 of a part within the body of unit 10 (see FIG. 2). Also integrated into the wheel on the front face of dished base 51 is a handle 54 in the form of a shaped spoke 54 as shown, readily manipulable by the hand of an operator. Circumferential wall 50 features steps 56 on its rear side, forming a cutout over a limited portion of the circumference to provide a release region 58, discussed further below.

Also integrated to the rear face of dished base 51 is an inner circumferential wall 60, which is shaped to provide a radial cam lobe 62 as shown in FIG. 3B, at an angle coincident with the centre of the outer circumferential wall cutout of release region 58. Within a bore in inner circumferential wall 60 behind cam lobe 62 a spring-loaded ball plunger 64 is mounted, to engage with indexing recesses provided on face 17 to which the wheel is attached. Further, inner circumferential wall 60 is integrated with two radial walls 68 which define therebetween a captive region 70, which interacts with a projecting stop on planar mounting part 17 to prevent rotation of wheel 22 beyond angular limits. Axle 52 is sealed by rubber bung 52 which engages with a central coaxial recess in handle 54. Additional bearings can be provided to increase the overall sturdiness of the integrated components that extend from dished base 51. For example, an annular bearing can be located concentrically with axle 52 by shortening radial walls 68.

In operation, when mounted in place on planar face 17, with axle 52 engaged in hub receiver 74, wheel 22 is able to be selectively rotated over an angle of 180°, limited by the engagement of walls 68 with stop 72, while ball plunger 64 indexes into recesses on face 17, such as recess 66.

FIGS. 4 and 5 illustrate the action of hot swapping of the battery modules, shown as views through section B-B of FIG. 3D.

The normal position (home position) of wheel 22 is shown in FIG. 4A, this being an indexed position, defined by recess 66. The battery locking is provided by the relative shaping and dimensions of release region 58 and the engagement projections 49 in each battery module. In the home position, the engagement projections 49 of both battery modules A and B (18, 20) are retained by circumferential wall 50. Both batteries are therefore held firmly in position, in electrical engagement with the unit.

Rotation of wheel 22 in the anticlockwise direction over a 'dwell area' of around 80° has no effect. At this point, cam lobe 62 begins to bear against the planar distal face of projection 49 of battery module A, urging module A in a leftward direction. Further rotation leaves projection 49 in release region 58 of circumferential wall 50, hence leading to ejection of module A. As discussed above, to achieve ejection of module A, left hand battery module latch 28 must be manually depressed. Hence, a definitive and positive two-handed action must be undertaken by the operator to eject a battery module. Finger indents 26 in the proximal part of the front of battery modules 18, 20 assist the operator in the lateral sliding required to withdraw the module from the unit. Corresponding finger indents (not shown) are replicated on the back of battery modules 18,20 to provide a solid 'claw-like' purchase upon the battery modules to aid removal.

FIG. 4D shows wheel 22 in its extreme anticlockwise eject position, around 90° from the home position. Once the wheel is released, it relaxes back into a second indexed position defined by a shaped recess which is around 80° from the home position (see FIG. 4E). It will be noted that in this position projection 49 of battery module B remains wholly retained, preventing its release.

When charged replacement battery module A is introduced, the planar distal face of projection 49 engages with the side of cam lobe 62, driving wheel 22 to a position which traps projection 49 (FIG. 4F), thus making the battery electrical connections and making the seal provided by battery engagement gasket 42. Manual clockwise rotation of the wheel back to the indexed home position returns the unit to the condition of dual locked battery modules, with latch 28 automatically re-engaging with the battery module.

FIGS. 5A-G show a similar operation with regard to ejection and replacement of battery unit B.

With regard to power PCA 36, the power circuitry is programmed to route power to the unit from a first battery module until it has been depleted to a prescribed threshold. In the unit developed and tested, this threshold was at a charge level equivalent to at least around 24 hours of reserve (as required for mine site environments). Power routing is then switched to the second module, allowing the first module to be swapped out. The power routing then switches back when the second module is similarly depleted. If first battery module is not swapped out, and the second module depletes to the prescribed threshold, the power circuitry routes power to the unit from both modules equally.

The power circuitry of PCA 36 includes a cross-point switch arrangement, which is configured such that, if an operator inadvertently acts to eject a battery module that is currently on load (rather than the depleted module), then the power routing is immediately and automatically switched to the other battery module, without interrupting the continuity of power to the unit.

As the skilled reader will understand, having both battery modules 18 and 20 removed from the unit is possible (which may be required for maintenance or repair of a unit, or to deactivate a unit not in use), but only on completion of a number of deliberate sequential operations, including sequential ejection of the two battery modules.

The unit described and illustrated employs two battery modules, but it will be understood that the design may readily be adapted to include any number of battery modules.

In addition to its meshing node function, the unit is also provided with functionality to read tags (in the WiFi band and/or Zigbee band) carried by personnel or mounted on equipment as part of a tracking and/or proximity detection system.

Attributes and advantages of the communications unit of the invention include:
- Light, small and portable.
- 802.11 b/g/n and optional 802.15.4 radio functionality.
- Self-contained and/or external antenna connections.
- 2 by 100 WHr 'Smart' LiON batteries for up to 6 days of operation on a single charge.
- 'Hot swap' battery mechanism allows battery modules to be changed out in place, without de-powering or moving the unit.
- Foolproof (mechanically and electrically) battery swap mechanism.
- Shoulder strap bar, accepts: shoulder clips, webbing straps, carabiners, cable hooks etc.
- Intrinsically Safe to IEC and MSHA requirements.
- Numerous accessories including: roof/rock bolts; keyhole mounting plates, canvas covers, fast chargers, etc.

The above description is provided by way of illustration only, and it will be understood that the broad scope and ambit of the invention embrace all modifications and variations thereto as would be apparent to persons skilled in the art.

It is to be understood that, throughout the description and claims of the specification, the word 'comprise' and variations of the word, such as 'comprising' and 'comprises', is not intended to exclude other additives, components, integers or steps.

Any discussion of documents, acts, materials, devices, articles or the like which has been included in the present specification is solely for the purpose of providing a context for the present technology. It is not to be taken as an admission that any or all of these matters form part of the prior art base or were common general knowledge in the field relevant to the present technology as it existed before the priority date of each claim of this specification.

Wireless Access Point/Repeater Node—Parts List

| Ref no. | Part | Material/function |
| --- | --- | --- |
| 10 | Wireless communications unit | |
| 11 | Housing | Polycarbonate |
| 11a | Rear housing | |
| 11b | Front housing | |
| 11c | Housing gasket seal | |
| 11d | Base plate | Stainless steel - structural reinforcement |
| 12 | Handle | |
| 14 | Antenna | Siemens ANT795-4MX |
| 14a | N-type antenna connection - female | |
| 14b | O-ring | |
| 14c | M16 washer | |
| 14d | M16 nut | |
| 16 | Controls and operation status panel | |
| 16a | Status decal | |
| 16b | Lens | Clear polycarbonate |
| 16c | Lens overmould | Empilon TPEHA80 |
| 17 | Planar mounting face | |
| 18 | Battery module A | |
| 20 | Battery module B | |
| 22 | Hot swapping wheel | Polycarbonate - Dual battery retention, single battery eject |
| 24 | Battery status/charge indicator | |
| 26 | Finger indent | |
| 28 | Battery module latch | Polycarbonate |
| 30 | Strap bar | Stainless steel |
| 32 | Main PCA (processing and radios) | |
| 34 | Display PCA | |
| 36 | Power PCA | |
| 38 | Battery contacts | |
| 40 | Power input contacts | |
| 42 | Battery engagement gasket | |
| 44 | Swing anchor and pivot | Polycarbonate |
| 46 | Latch return spring | Stainless steel |
| 48 | Arcuate concave face | |
| 49 | Engagement projection | |
| 51 | Dished base | |
| 50 | Circumferential wall | |
| 52 | Axis (ball raced axle) | |
| 54 | Wheel handle (spoke) | |
| 56 | Wall step | |
| 58 | Release region | |
| 60 | Inner circumferential wall | |
| 62 | Cam lobe | |
| 64 | Spring ball plunger | |
| 66 | Indexing recess | |
| 68 | Radial walls | |
| 70 | Captive region | |
| 72 | Stop | |
| 74 | Hub | |
| 76 | Bung | |

Approximate Dimensions of Unit (Refer FIG. 1):
Width: 310 mm
Height: 230 mm
Depth: 80 mm
Handle: Ø 25 mm, length 110 mm

The invention claimed is:

1. A wireless communications unit, comprising:
   at least first and second removable power source modules engageable with and electrically connectable to the wireless communications unit to provide electrical power thereto; and
   a mechanism comprising a rotatable wheel to allow selective disconnection and removal of the first removable power source module from the wireless communications unit while maintaining connection and retention of the second removable power source module to the wireless communications unit.

2. The wireless communications unit of claim 1, wherein the wireless communications unit is a portable unit to serve as at least one of an access point and a repeater node in a wireless meshing network.

3. The wireless communications unit of claim 2, wherein the wireless communications unit includes recess ports sized and shaped to receive the removable power source modules, and wherein the removable power source modules are of a common form, such that each removable power source module can be received by different recess ports.

4. The wireless communications unit of claim 1, wherein the mechanism includes a retention element configured to physically engage with a part of each removable power source module.

5. The wireless communications unit of claim 1, wherein the mechanism can be operated to eject and disconnect the first removable power source module.

6. The wireless communications unit of claim 5, wherein (i) the mechanism includes a retention element configured to physically engage with a part of each removable power source module and (ii) the operation of the mechanism simultaneously acts on the retention element to maintain engagement of the retention element with the second removable power source module.

7. The wireless communications unit of claim 1, wherein the rotatable wheel has a radially projecting portion, such that, when the rotatable wheel is rotated, the projecting portion bears against a part of the first removable power source module to urge the first removable power source module into an ejected position and electrically disconnect the first removable power source module from the wireless communications unit.

8. The wireless communications unit of claim 7, wherein the mechanism includes a retention element configured to physically engage with a part of each removable power source module, the rotatable wheel provides the retention element, and rotation of the rotatable wheel brings the retention element into engagement with a complementary shaped retention portion of the second removable power source module.

9. The wireless communications unit of claim 8, wherein the removable power source modules are removed in a direction substantially perpendicular to the axis of rotation of the rotatable wheel.

10. The wireless communications unit of claim 7, wherein the mechanism is configured such that rotating the rotatable wheel clockwise provides disconnection and ejection of the first removable power source module, and rotating the rotatable wheel anticlockwise provides disconnection and ejection of the second removable power source module.

11. The wireless communications unit of claim 7, wherein the mechanism includes indexed means to hold or bias the mechanism in at least one position.

12. The wireless communications unit of claim 7, wherein the removable power source modules are removed in a direction substantially perpendicular to the axis of rotation of the rotatable wheel.

13. The wireless communications unit of claim 1, further comprising a latching element for at least the first removable power source modules, wherein actuation of the latching element is required in addition to operation of the mechanism, in order to remove the first removable power source module.

14. The wireless communications unit of claim 1, configured to comply with fire and explosion protection measures suitable for an intended application.

15. The wireless communications unit of claim 1, further comprising dedicated power circuitry to selectively route power from each removable power source module in accordance with a protocol, wherein, when the first removable power source module is depleted to a prescribed threshold, power is routed from the second removable power source module.

16. The wireless communications unit of claim 15, wherein the protocol provides that, when all of the removable power source modules are depleted to the prescribed threshold, power is routed from all of the removable power source modules.

17. The wireless communications unit of claim 16, wherein the protocol provides that, when power is routed from the first removable power source module and the first removable power source module becomes disconnected, power is automatically re-routed from the second removable power source module.

18. The wireless communications unit of claim 15, wherein the protocol provides that, when power is routed from the first removable power source module and the first removable power source module becomes disconnected, power is automatically re-routed from the second removable power source module.

19. The wireless communications unit of claim 1, wherein the removable power source modules are rechargeable battery modules, and the wireless communications unit includes at least one of a battery status indicator and a charge level indicator for each removable power source module.

20. The wireless communications unit of claim 1, configured to work with an 802.11 wireless protocol.

21. The wireless communications unit of claim 1, configured to act as a tag reader to provide presence, location, or proximity determination of tags carried by personnel or provided on equipment or vehicles.

22. A communications system comprising a plurality of the wireless communications units in accordance with claim 1.

23. The wireless communications unit of claim 1, wherein the wireless communications unit includes recess ports sized and shaped to receive the removable power source modules, and wherein the removable power source modules are of a common form, such that each removable power source module can be received by different recess ports.

* * * * *